United States Patent
Sättele (10) Patent No.: US 11,789,888 B2
(45) Date of Patent: *Oct. 17, 2023

(54) METHOD FOR RECOGNIZING THE POSITION OF A BUS SUBSCRIBER

(71) Applicant: Conti Temic microelectronic GmbH, Nuremberg (DE)

(72) Inventor: Peter Sättele, Biberach/Riss (DE)

(73) Assignee: Conti Temic Microelectronic GmbH

(*) Notice: Subject to any disclaimer, the term of this patent is extended or adjusted under 35 U.S.C. 154(b) by 39 days.

This patent is subject to a terminal disclaimer.

(21) Appl. No.: 17/628,786

(22) PCT Filed: Jul. 1, 2020

(86) PCT No.: PCT/DE2020/200053
§ 371 (c)(1),
(2) Date: Jan. 20, 2022

(87) PCT Pub. No.: WO2021/032254
PCT Pub. Date: Feb. 25, 2021

(65) Prior Publication Data
US 2022/0276978 A1 Sep. 1, 2022

(30) Foreign Application Priority Data
Aug. 20, 2019 (DE) ...................... 10 2019 212 415.1

(51) Int. Cl.
*G06F 13/42* (2006.01)
*H04L 12/40* (2006.01)

(52) U.S. Cl.
CPC .............. *G06F 13/42* (2013.01); *H04L 12/40* (2013.01); *H04L 2012/40273* (2013.01)

(58) Field of Classification Search
CPC .................................. G06F 13/42; H04L 12/40
(Continued)

(56) References Cited

U.S. PATENT DOCUMENTS 2,138,161 A * 11/1938 Hansell ................ H03B 5/1835
333/219
2,728,048 A * 12/1955 Priedigkeit ............ G01R 27/02
324/600
(Continued)

FOREIGN PATENT DOCUMENTS

| CN | 101960328 A | 1/2011 |
| DE | 100 48 745 | 2/2002 |

(Continued)

OTHER PUBLICATIONS

English translation of the International Search Report of the International Searching Authority for International Application PCT/DE2020/200053, dated Oct. 20, 2020, 3 pages, European Patent Office, HV Rijswijk, Netherlands.
(Continued)

*Primary Examiner* — Paul R. Myers
(74) *Attorney, Agent, or Firm* — RatnerPrestia (57) ABSTRACT

The invention relates to a method for detecting the position of a bus subscriber (2, 2a, 2b, 2n) of a bus system, in which a control device (1) and several bus subscribers (2, 2a, 2b, 2n) are provided. The bus subscribers (2, 2a, 2b, 2n) are respectively in a position (P1, P2, Pn) to be detected and are connected to the control device (1) via at least one line, the line to the respective bus subscriber (2, 2a, 2b, 2n) having a definable line length (L1, L2, Ln), and the position of a bus subscriber (2, 2a, 2b, 2n) is then detected in that the control device (1) sends a signal via the line to the respective bus subscriber (2, 2a, 2b, 2n) within a measurement cycle and the bus subscriber (2, 2a, 2b, 2n) responds. The measurement cycle duration is determined and a ratio of measurement cycle duration and line length (L1, L2, Ln) is used to detect the position.

15 Claims, 4 Drawing Sheets

(58) Field of Classification Search
USPC .......................................................... 710/105
See application file for complete search history.

(56) References Cited

U.S. PATENT DOCUMENTS

| | | | | |
|---|---|---|---|---|
| 3,403,334 | A * | 9/1968 | Hoote | G01R 27/32 324/645 |
| 3,516,025 | A * | 6/1970 | Podell | H01P 5/22 333/120 |
| 5,339,022 | A | 8/1994 | Fleming et al. | |
| 5,733,511 | A * | 3/1998 | De Francesco | H05H 1/46 422/907 |
| 6,041,224 | A * | 3/2000 | Wada | H01P 1/2039 333/204 |
| 7,076,694 | B2 | 7/2006 | Schuster | |
| 9,494,450 | B2 | 11/2016 | Nagy | |
| 11,009,877 | B2 | 5/2021 | Hofmann et al. | |
| 2003/0128039 | A1 | 7/2003 | Watkins | |
| 2003/0222654 | A1 * | 12/2003 | Furse | G01F 23/284 324/543 |
| 2004/0098514 | A1 * | 5/2004 | Schuster | H04L 43/50 370/257 |
| 2007/0014393 | A1 * | 1/2007 | Jensen | H04B 3/46 379/30 |
| 2007/0164830 | A1 * | 7/2007 | Aikawa | H03B 5/1852 331/107 SL |
| 2007/0201583 | A1 * | 8/2007 | Yen | H04L 25/022 375/340 |
| 2010/0023663 | A1 | 1/2010 | Bachhuber et al. | |
| 2020/0092137 | A1 | 3/2020 | Jerolm | |

FOREIGN PATENT DOCUMENTS

| | | |
|---|---|---|
| DE | 102005055964 | 5/2007 |
| DE | 102014215005 | 2/2016 |
| DE | 102016212645 | 1/2018 |
| DE | 102017208831 | 11/2018 |
| EP | 1196094 A2 | 4/2002 |
| EP | 2 804 010 | 11/2014 |
| WO | WO 2016/184889 | 11/2016 |
| WO | WO 2017/064280 | 4/2017 |

OTHER PUBLICATIONS

PCT International Preliminary Report on Patentability including English Translation of PCT Written Opinion of the International Searching Authority for International Application PCT/DE2020/200053, dated Feb. 17, 2022, 7 pages, International Bureau of WIPO, Geneva, Switzerland.

German Search Report for German Patent Application 10 2019 212 415.1, dated Jul. 29, 2020, 12 pages, German Patent and Trademark Office, Muenchen, Germany, with English partial translation, 10 pages.

Chinese Office Action for Chinese Application No. 202080058283.9, dated Mar. 30, 2023 with translation, 12 pages.

Mondal et al., "Estimation of Frequency and Amplitude of Ring Oscillator Built Using Current Sources", Ain Shams Engineering Journal, Amsterdam, NL, Sep. 1, 2020, vol. 11(3), pp. 677-686, XP093029158.

European Communication for European Application No. 20761515.4, dated Mar. 13, 2023 with translation, 14 pages.

English Translation of the International Search Report of the international Searching Authority for International Application PCT/DE2020/200067, dated Dec. 1, 2020, 2 pages, European Patent Office, HV Rijswijk, Netherlands.

PCT International Preliminary Report on Patentability including English Translation of PCT Written Opinion of the International Searching Authority for International Application PCT/DE2020/200067, dated Feb. 17, 2022, 7 pages, International Bureau of WIPO, Geneva, Switzerland.

German Search Report for German Patent Application 10 2019 212 414.3, dated Jul. 29, 2020, 12 pages, German Patent and Trademark Office, Nuenchen, German, with English partial translation, 10 pages.

Notice of Allowance for U.S. Appl. No. 17/628,755, dated Jun. 13, 2023, 11 pages.

* cited by examiner

METHOD FOR RECOGNIZING THE POSITION OF A BUS SUBSCRIBER

The present invention relates to a method for detecting the position of a bus subscriber or bus subscribers and a bus system, in which the position of the bus subscriber or the bus subscribers is in particular detected on the basis of a method according to the invention.

TECHNOLOGICAL BACKGROUND

Modern means of transportation such as motor vehicles or motorcycles are increasingly being equipped with driver assistance systems which, with the aid of sensor systems, capture the surroundings, detect the traffic situation and support the driver, e.g., by means of a braking or steering intervention or by outputting an optical or acoustic warning. Ultrasonic sensors, camera sensors, surround view cameras, radar sensors, lidar sensors or the like are regularly deployed as sensor systems for capturing the surroundings. Conclusions regarding the surroundings can subsequently be drawn from the sensor data determined by the sensors, by means of which assistance functions for supporting the driver during parking and/or driving maneuvers can be realized.

The sensors are usually connected to a control device or a control unit or a controller (Electronic Control Unit, ECU) via a bus or a bus system as bus subscribers, wherein a bus is to be understood to be a system for data transmission between several (bus) subscribers via an in particular common transmission path. Furthermore, when installing or fitting the bus subscribers, e.g., several ultrasonic sensors or surround view cameras, it is particularly important to know the respective bus subscriber or installation position for the desired assistance function. Accordingly, it is necessary to know which sensor is arranged or installed in which position in the vehicle. The respective installation position can be detected or established, e.g., by means of an explicit configuration (e.g., by end-of-line programming, "DIP switches", etc.) or by carrying out "teaching" (e.g., by manually or automatically activating an identifiable feature on the bus subscriber, wherein said feature may always only be activated for one subscriber at a time). However, the explicit configuration or the teaching requires additional configuration steps when installing the sensors (which typically takes place at the end of the line or during servicing in vehicle construction), which cannot usually be automatically carried out by the system. Therefore, this type of position detection is not process-reliable and means additional time outlay and expenditure. Circuitry-related measures can additionally be taken such as coding the subscriber position by additional address information at the installation location (e.g., by additional address pins in the connector plug which are coded differently according to the position) or by wiring the bus line to a so-called "daisy chain", i.e., the connection to the downstream bus segment is "looped through" the bus subscriber circuit and can be actively interrupted by the circuit of the bus subscriber. However, due to the connection configuration, such a coding requires additional outlay at the input circuitry of the bus subscribers. In addition, the different wiring of the bus connectors for the individual bus subscribers requires increased production outlay and is, in addition, an additional source of errors.

PUBLISHED PRIOR ART

Three-wire buses (power, bus, ground) or bus systems are known from the prior art, in which it is, e.g., possible to conduct the coding by a connection configuration. For example, an auto detection device for detecting a bus subscriber or sensor within an electronic sensor system is known from WO 2017/064280 A1, wherein the sensor system can be a parking sensor system having ultrasonic sensors. Up to 6 different configurations can be supported and detected by cyclically swapping the connections at the respective bus subscriber.

Problem of the Present Invention

The problem of the present invention consists of providing a method as well as a device for detecting the position of the bus subscribers of a bus system, by means of which the detection of position can be improved in a simple and cost-effective manner without additional component costs, and the disadvantages of the prior art can be overcome.

Solution to the Problem

The aforementioned problem is solved by the entire teaching of claim 1 as well as the alternative independent claims. Expedient embodiments of the invention are claimed in the subclaims.

In the case of the method according to the invention for detecting the position of a bus subscriber of a bus system, at least one control device and several bus subscribers are provided. The bus subscribers are respectively in a position to be detected and are connected to the control device via at least one line, in particular a line for data, signal, energy and/or message transmission. The line to the respective bus subscriber has a definable line length. The position of the respective bus subscriber is then detected in that the control device sends a signal or a pulse via the line to the respective bus subscriber, and the bus subscriber responds with a response pulse, response signal or the like. The control device can determine a transit time of the signal, e.g., within which the signal is sent and the bus subscriber responds. The ratio of this transit time to the line length can then be calculated so that the ratio of transit time and line length can be used to detect the position, for example in that a specific transit time duration corresponds to a specific line length. The method according to the invention consequently provides a novel, autonomous position determination for bus subscribers on an in particular shared bus system ("shared medium"), which can be realized without manual interventions or additional pins on the sensor or elaborate wiring in the sensor. Accordingly, only a small amount of hardware is required, which can be realized, e.g., in sensor/ECU ASICs. In addition, a simple type of bus wiring of sensors is made possible, as a result of which individual lines from the sensor to the controller can be saved, resulting in turn in an economic advantage in vehicle construction. In addition, smaller controller plugs (e.g., 6 lines instead of 16 lines for 12 ultrasonic sensors) can be made possible. Furthermore, the number of bus subscribers to be measured is not limited.

According to a preferred embodiment of the present invention, the bus subscriber can be a sensor, in particular an ultrasonic sensor. For example, several ultrasonic sensors can be deployed as distance sensors in a vehicle in order to realize a parking assistant. The ultrasonic sensors are distributed in/on the vehicle to guarantee "all-round visibility". The respective installation positions can then be automatically detected by means of the method according to the invention, via the different line lengths to a central control device. (such as, e.g., Electronic Control Unit, ECU, or Automated Driving Control Unit, ADCU). This considerably simplifies the installation of the ultrasonic sensors, as they do not have to be labeled any further when they are installed and the system can configure itself automatically afterwards. Furthermore, other vehicle sensors known from the prior art can also be provided as bus subscribers such as, e.g., a radar sensor, camera, lidar sensor or the like. Moreover, the method can be utilized with all types of "shared medium" bus systems, in which the connected bus subscribers are to be identified via their position on the bus, e.g., also with airbag sensors. Alternatively or additionally, an actuator could also be provided as a bus subscriber (e.g., in the case of networked lights or the like).

The bus subscribers can expediently each have different definable line lengths. As a result, the position can be detected in a particularly simple manner. Alternatively, said position can be established on the basis of (relative) line lengths which can be estimated, or said position can be estimated via a measured signal strength. The line lengths do not have to be established absolutely, since the method can also be carried out on the basis of relative line lengths (e.g., sensor 1 has the largest line length, sensor 2 the second largest line length, etc.).

The control apparatus can expediently emit a signal which triggers the emission of a response signal in the respective bus subscriber. A delay can then be preferably provided following the receipt of the signal by the bus subscriber before the bus subscriber of the control device responds. Alternatively or additionally, a delay can also be provided following the receipt of the response by the bus subscriber before the control device sends a signal or a pulse to the bus subscriber again.

According to a preferred embodiment of the invention, in order to detect the position of a bus subscriber, several measurement cycles are carried out one after the other, wherein the total duration thereof can be established.

The ratio of the total duration of the measurement cycles to the line length can subsequently be calculated such that said ratio is used to detect the position. As a result of this addition of the measurement cycles, a sufficiently large temporal measuring variable for measuring is produced.

The measurement cycle can advantageously be repeated more than 10,000 times, preferably more than 100,000 times, particularly preferably more than 1,000,000 times in order to produce a sufficiently large temporal measuring variable.

The ratio of transit time and line length can expediently be derived by comparing or correlating the transit times and/or the total durations of the measurement cycles for the respective bus subscribers and correspondingly assigning them according to their sizes to the respective line lengths.

The bus subscriber, the position of which is to be detected, can advantageously be placed in a measuring state (e.g., apparatus for accessing the bus is switched on), while the remaining bus subscribers are placed in a neutral state (e.g., apparatus for accessing the bus is switched off).

Furthermore, the control device can comprise a measuring apparatus which can capture the time period and/or the signals (number of signals, signal strength, type of signal and the like). Furthermore, a method for detecting the position of a bus subscriber is claimed, in alternative independent or subordinate claims, which comprises the following method steps:

sending a signal by the control device to the bus subscriber, the position of which is to be detected,
receiving a response from the respective bus subscriber,
capturing the response on the arrival of the response and/or capturing the time period between sending and receiving the signal,
waiting for a fixed time, as well as
reading out the counter reading and/or the time measuring apparatus from the measuring apparatus.

The method preferably further comprises the method steps of applying a correction factor read out from the bus subscriber (to correct the transit times of the pulses/signals between the control device and the bus subscriber due to disturbances or losses), as well as storing or saving the result, e.g., in a memory of the control device, for later evaluation.

The method steps can be expediently repeated for a specific total duration and/or for a definable number for each position to be established or for each bus subscriber.

According to a preferred embodiment of the method, the method steps are carried out for each bus subscriber of the bus system.

In particular, the methods according to the invention can also be a computer-implemented method, the term "computer-implemented method" within the meaning of the invention being understood to mean a sequence planning or procedure which is implemented or carried out on the basis of a computer. The data processor such as, e.g., a computer, a computer network, a controller or a control device, a microcontroller or microprocessor or another programmable control device known from the prior art can process data by means of programmable calculation specifications. With regard to the method, essential properties can be occasioned e.g., by a new program, new programs, an algorithm or the like.

The present invention claims, in alternative independent or in subordinate claims, a bus system having position detection of bus subscribers, the installation position being detected in particular on the basis of a method according to the invention. For this purpose, the bus system comprises a control device as well as several bus subscribers which are respectively in the position to be detected. The bus subscribers are connected to the control device via at least one line, the line to the respective bus subscriber having a definable line length and the position of the bus subscriber being detected in that the control device sends an impulse via the line to the respective bus subscriber within a measurement cycle and the corresponding bus subscriber responds. This can take place in a practical manner in that the bus subscriber is preconfigured via a specific address. The control device further determines the duration of the measurement cycle or measurement cycle duration, wherein the ratio of measurement cycle duration and line length is used to detect the position.

DESCRIPTION OF THE INVENTION WITH
REFERENCE TO EXEMPLARY
EMBODIMENTS

The invention is explained in greater detail below with reference to expedient exemplary embodiments, wherein.

Figure 1:
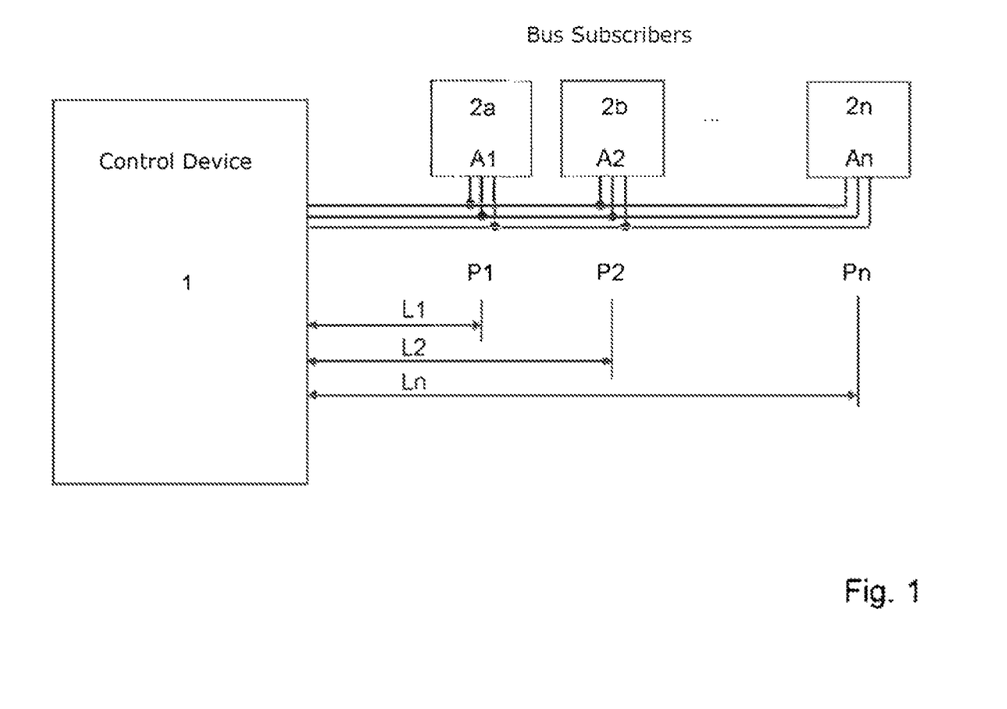
FIG. 1 shows a simplified schematic representation of a general plan of a bus system, in which the installation positions of the respective bus subscribers are automatically detected by way of the method according to the invention.
Figure 2:
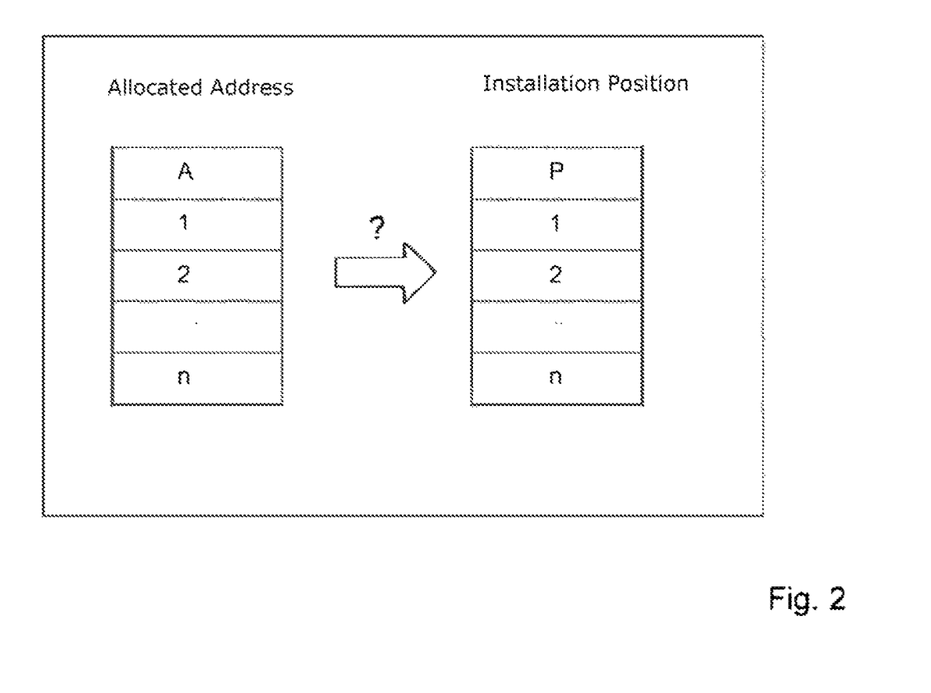
FIG. 2 shows a simplified schematic representation of the assignment of a sensor address within the bus system.

A general plan of a connection circuit or a bus system, in which several bus subscribers 2a, 2b . . . 2n, e.g., ultrasonic distance sensors, are connected to a common supply and communication bus of a control device 1 ("shared medium"), is depicted in FIG. 1. The bus subscribers 2a, 2b, 2n are arranged in a specific installation position P1, P2, Pn and each have a different line length L1, L2, Ln to the control device 1. For example, the bus or the lines can be embodied with three wires (supply voltage, communication signal and ground), so that the bus subscribers or (ultrasonic distance) sensors equally have only three connection pins as well. In addition, the bus subscribers are allocated unique addresses A1, A2, An (e.g., serial numbers or the like), via which they can be addressed individually. In order to evaluate the sensor signals, the controller must know the mechanical installation position of the respective sensor, e.g., front left, front right and the like. For this purpose, the sensor address must be assigned to the (a priori unknown) actual position in the controller software, as depicted in a simplified manner in FIG. 2.

Figure 3:
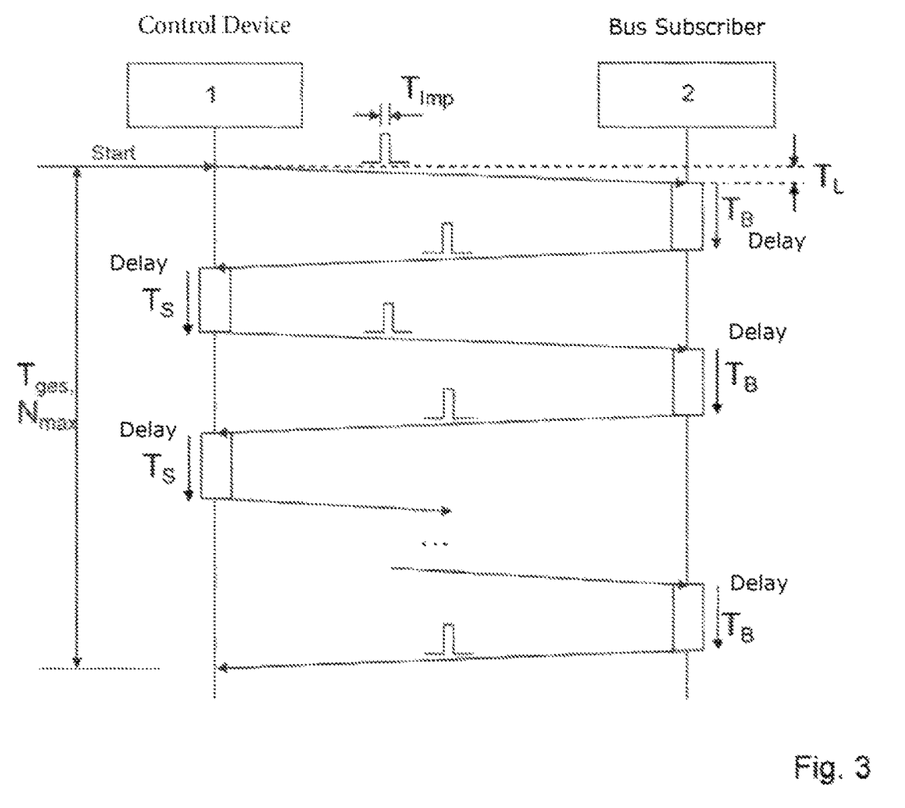
FIG. 3 shows a simplified schematic representation of the measuring principle according to the method according to the invention.

An embodiment of the course of the method for establishing the respective installation position (measuring principle) is depicted in FIG. 3 and is based on the fact that a short pulse (e.g., $T_{Imp}$<approx. 1 usec duration) is emitted by the control device 1, which is received via the signal line of the bus after the transit time $T_L$ by the bus subscriber 2, the installation position of which is to be determined. As a result, after a fixed delay $T_B$ (where $T_B$>$T_{Imp}$), which is sufficiently constant over the measurement period, a corresponding response pulse can be produced, which is in turn sent back on the signal line to the control device 1. The response pulse is, in turn, received after the transit time $T_L$ in the control device 1, as a result of which after a fixed delay $T_S$ (where $T_S$>$T_{Imp}$) a renewed measurement cycle is triggered. This measurement cycle is subsequently repeated a high number of times (e.g., 100,000 or 1,000,000 times) such that the comparatively short signal transit time $T_L$ (approx. 3.5 nsec per meter of line length) for a direct measurement is added to a particularly easily measurable variable which flows into the total duration of the measurement such that it can be evaluated. This measurement is in addition repeated for all bus subscribers, wherein a concluding comparison of the respective total durations supplies the sought sequence of the bus subscribers 2a, 2b, 2n on the bus, i.e., the longest time period of the measurement cycle or measurement cycle duration corresponds, e.g., to the longest line length, wherein the time period of a measurement cycle is calculated, e.g., by $T_L+T_S+T_L+T_S$ or $T_L+T_B+T_L$.

Figure 4:
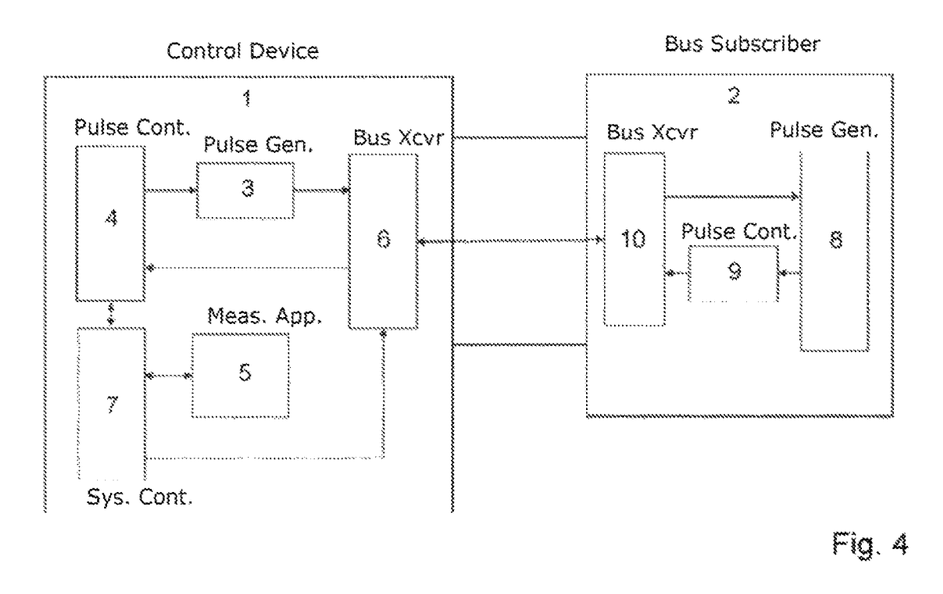
FIG. 4 shows a simplified schematic representation of a first embodiment of a control device and of a bus subscriber, the installation position of which is automatically detected by means of the method according to the invention.

FIG. 4 shows a control device 1 according to the invention, which comprises a pulse generator 3, a pulse control 4, a measuring apparatus 5, an apparatus for accessing the bus 6 (bus transceiver) as well as a system control 7. The pulse generator 3 is embodied in such a way that it, in each case triggered by a trigger pulse of the system control 7, supplies short individual pulses (e.g., having a pulse duration in the 100-nsec range). Furthermore, communication takes place via the bus access 6 with a bus subscriber 2 which, to this end, likewise has a bus access 10 and, moreover, a pulse generator 8 and a pulse control 9.

Figure 5:
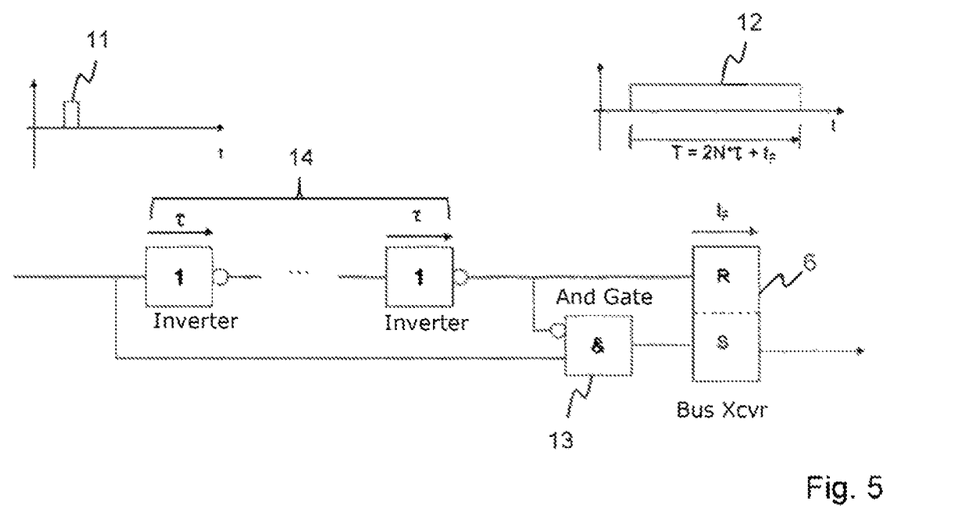
FIG. 5 shows a simplified schematic representation of an example implementation of the method according to the invention by the controller.
Figure 6:
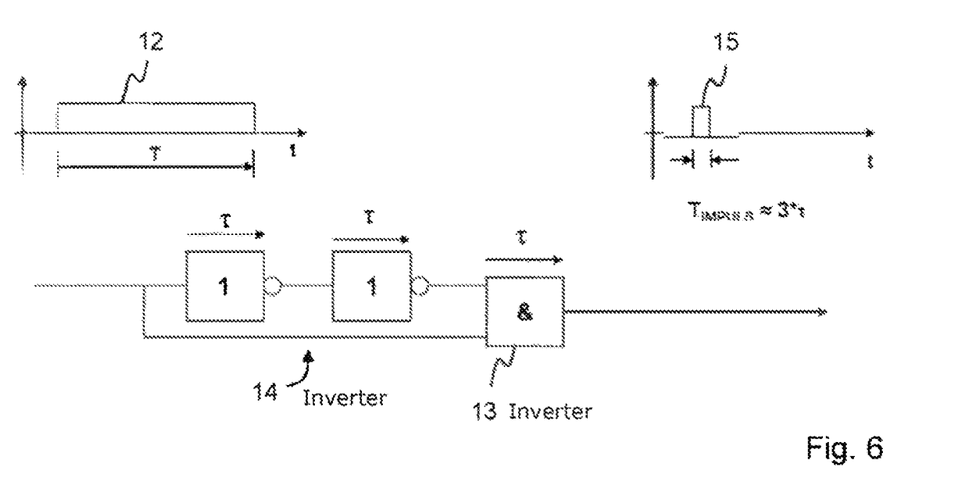
FIG. 6 shows a simplified schematic representation of an example implementation of the method according to the invention by the bus subscriber.

FIG. 5 shows an example implementation, in which the pulse control is constructed in such a way that it is triggered by a pulse received from the bus. After the pulse has subsided and the transmitting direction of the bus has switched over, if necessary, a trigger pulse 11 for the pulse generator 3 is triggered. Furthermore, the resulting delay between the arrival of the reception pulse and the creation of the trigger pulse 11 is constant over the duration of the entire measuring process. Furthermore, a timing element can also be provided, as shown in FIG. 5 on the basis of the AND gate 13 and the inverter gate 14. The apparatus for accessing the bus 6 is constructed as a switching apparatus, has a "RS flip flop" (closed series connection with an even number of inverters with two stable states of the output signal) and makes it possible, while checking the control and pulse control, to power on the measuring apparatus 5 at the bus and, therefore, to output an output signal 12 and to switch over the sending and receiving direction (R/S; receiver/sender) during the measurement. During this, the measuring apparatus 5 realizes the function of a counter and timer. In FIG. 6, the input of the output signal 12 at the bus subscriber 2 is depicted, which sends a response pulse 5 as a consequence.

The system control 7 serves to configure the system components on the control device and on the bus subscriber, by means of appropriate communication via the bus. Furthermore, the system control 7 can control the measurement sequence and evaluate the respective result. The pulse control 8, the pulse generator 9 and the apparatus for accessing the bus 10 are configured or constructed in accordance with the pulse control 4, the pulse generator 3 and the apparatus for accessing the bus 6 of the control device 1. The apparatus for accessing the bus 10 can be a "loopback mode" (loopback state), in which a pulse received on the line is converted immediately into a corresponding pulse in the opposite direction for a definable time period. In addition, a "neutral state" of the bus subscriber 2 can be made possible at the bus. The neutral state of the bus subscriber 2 is to be designed in such a way that it does not react to signals from the bus for a specific time period (of a roughly similar order of magnitude to that for the loopback mode), but then automatically returns to the "normal" operating state. The subscriber-mounted apparatus for accessing the bus 10 can, in addition, be configured in such a way that the measuring apparatus 5, at the command of the control device, is converted for the duration of the measurement into a measuring state, and thereafter automatically returns to the "normal" operating state. The measuring state is characterized by the activating of the measuring apparatus 5 as well as the switching on of the measuring apparatus 5 at the bus.

For the method according to the invention, it is initially assumed that the bus subscribers 2, 2a, 2b, 2n can be addressed individually via unique addresses (e.g., serial numbers or the like). The methods for determining addresses are protocol-specific, sufficiently well-known and are explicitly not the subject-matter of the present method. In addition, it is assumed that the bus subscribers 2, 2a, 2b, 2n, if applicable, have a correction value which can be read out, which can compensate for manufacturing-specific fluctuations in those component properties that have an influence on the measured value. This value can, e.g., be determined during a production test under fixed conditions.

According to a preferred embodiment of the course of the method, the method according to the invention, from the viewpoint of the control device, can initially place or configure the bus subscriber, the position of which is to be detected or determined, in the measuring state (e.g., bus subscriber 2a with address A1). Accordingly, the other bus subscribers 2b, 2n are placed in the neutral state. Thereafter, a measuring sequence of measurement cycles can be started by emission of a pulse from the pulse generator 3 of the control device 1 for a definable total duration $T_{ges}$, or a fixed number of measuring sequences $N_{max}$. The control device 1 then waits for a response or a response pulse from the bus subscriber 2a to be measured. After the response has been provided, the control device 1 can count the response pulse or capture the measurement cycle duration via the measuring apparatus 5 on arrival of the response pulse. It can further be provided that the control device 1 waits for a fixed time $T_s$ prior to or after capturing the measurement cycle duration until it sends a new pulse or a new signal. Thereafter, the counter reading and/or the time measurement can be read out. The bus subscriber 2a can expediently establish a correction factor which the control device 1 can read out and apply before it saves the results in a memory for later evaluation. These method steps can then be repeated for the remaining or all the known bus subscribers such that an assignment of the stored results, e.g., in an ascending or descending order, can subsequently take place. The order thus founds reflects the physical sequence of the bus subscribers 2a, 2b . . . 2n on the bus in accordance with their fixed line lengths L1, L2 . . . Ln such that these can then be assigned in a simple manner to the corresponding positions P1, P2 . . . Pn.

Figure 7:
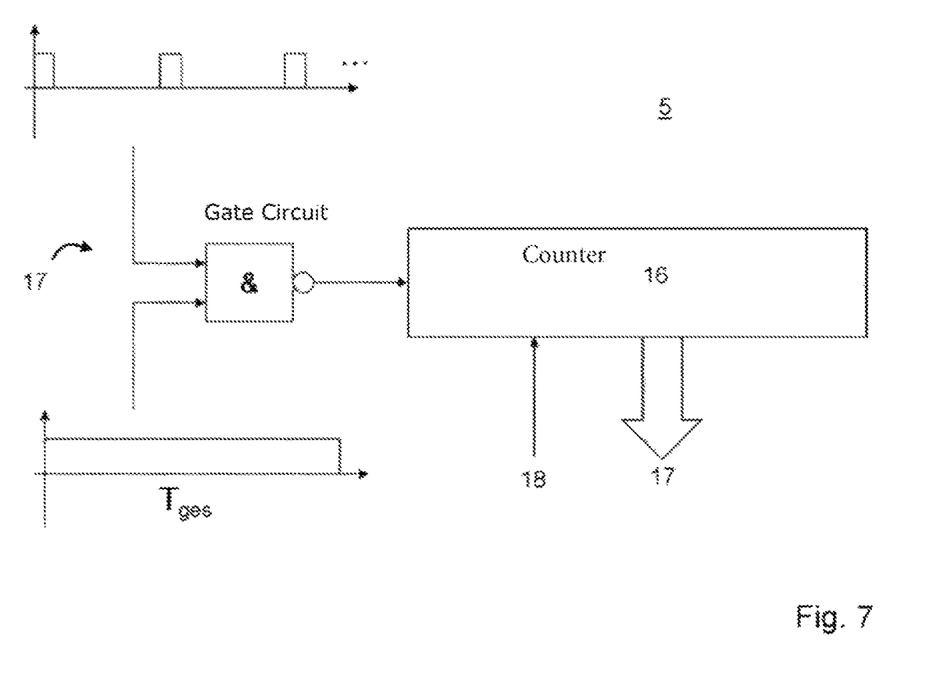
FIG. 7 shows a simplified schematic representation of an embodiment of a measuring apparatus which executes the method according to the invention.

FIG. 7 shows an example of a measuring apparatus 5, in which the measuring apparatus 5 can be realized in a simple manner by a simple counter circuit 16 having sufficient width (e.g., 48 bits), in that the counter circuit 16 is supplied with the received pulses via a gate circuit 17. The pulses are released for the duration of the measurement to the counter or to the counter circuit 16 via the second input of the gate circuit 17, and moreover blocked. The number of the pulses counted within the measurement duration is a measure of the pulse transit time on the line and, therefore, the length thereof to the respective bus subscriber 2 and can be output via the output 18. Since only the relative differences of the measurements among themselves are an issue, the absolute duration of the measurement is not critical; the only critical factor is their repeatability over several measurements of a measurement cycle (usually a few seconds). However, this goal can be achieved by means of conventional timer/counter assemblies of a controlling microcontroller or comparable timer circuits. Furthermore, a reset input or reset 19 is provided, by means of which, e.g., an (automatic) reset function or a resetting or restarting of the measuring apparatus 5 can be brought about.

LIST OF REFERENCE NUMERALS

1 Control device
2, 2a, 2b, 2n Bus subscriber
3 Pulse generator
4 Pulse control
5 Measuring apparatus
6 Apparatus for accessing the bus
7 System control
8 Pulse generator
9 Pulse control
10 Apparatus for accessing the bus
11 Trigger pulse
12 Output signal
13 AND gate
14 Inverter gate
15 Response pulse
16 Counter circuit
17 Gate circuit
18 Output
19 Reset
A1, A2, An Address
L, L1, L2, Ln Line length
P1, P2, Pn Position

The invention claimed is:

1. A method for detecting the position of a bus subscriber of a bus system, in which
   a control device and several bus subscribers are provided, wherein
   the bus subscribers are respectively in a position to be detected and
   are connected to the control device via at least one line, wherein
   the line to the respective bus subscriber has a definable line length, and
   the position of a bus subscriber is then detected in that
   the control device sends a signal via the line to the respective bus subscriber within a measurement cycle and the bus subscriber responds, wherein
   the measurement cycle duration is determined and
   a ratio of measurement cycle duration and line length is used to detect the position.

2. The method according to claim 1, wherein the bus subscriber is an actuator or a sensor, in particular an ultrasonic sensor.

3. The method according to claim 1, wherein the bus subscribers each have different definable line lengths.

4. The method according to claim 1, wherein following the receipt of the signal by the bus subscriber a delay is provided before the bus subscriber responds and/or following the receipt of the response by the bus subscriber a delay is provided before the control device sends a signal to the bus subscriber.

5. The method according to claim 1, wherein in order to detect the position of a bus subscriber several measurement cycles are provided, the total duration of said measurement cycles being established.

6. The method according to claim 5, wherein the ratio of the total duration of the measurement cycles to the line length is calculated and is used to detect the position.

7. The method according to claim 5, wherein the measurement cycle is repeated more than 10,000 times, preferably more than 100,000 times, particularly preferably more than 1,000,000 times.

8. The method according to claim 5, wherein the ratio of transit time and line length is created by comparing the transit times and/or total durations of the measurement cycles of the respective bus subscribers and correspondingly assigning the bus subscribers according to the sizes of the bus subscribers respective line lengths.

9. The method according to claim 1, wherein the bus subscriber, the position of which is to be detected, is placed in a measuring state, while the remaining bus subscribers are placed in a neutral state.

10. The method according to claim 1, wherein the control device comprises a measuring apparatus which can capture the time period between sending and receiving the signals.

11. A method for detecting the position of a bus subscriber of a bus system, according to claim 1, wherein the method comprises the following method steps:

sending a signal by the control device to the bus subscriber, the position of which is to be detected, receiving a response from the respective bus subscriber, capturing the response on the arrival of the response and/or capturing the time period between sending and receiving the signal, waiting for a fixed time Ts, reading out a counter reading and/or a time measuring apparatus.

12. The method according to claim 11, wherein the method further comprises the following method steps of:

applying a correction factor read out from the bus subscriber-, as well as storing a result of the applying step for later evaluation.

13. The method according to claim 11, wherein the method steps are repeated for a specific total duration or for a definable number.

14. The method according to claim 11, wherein the method steps are carried out for all the bus subscribers of a bus system.

15. A bus system having position detection of bus subscribers, on the basis of a method according to claim 1, comprising a control device, several bus subscribers which are in a position to be detected, and the bus subscribers are connected to the control device via at least one line, wherein the line to the respective bus subscriber has a definable line length, and the position of a bus subscriber is detected in that the control device sends a pulse via the line to the respective bus subscriber within a measurement cycle and the bus subscriber responds, wherein the control device determines the measurement cycle duration, and a ratio of measurement cycle duration and line length is used to detect the position.

\* \* \* \* \*